United States Patent Office 3,736,308
Patented May 29, 1973

3,736,308
METHOD FOR THE PREPARATION OF POLY-
EPOXIDES BY POLYMERIZING 1,2-EPOXIDES
BY THE USE OF A NOVEL CATALYST
Koji Hashimoto, Yokohama-shi, Noboru Mogi, Kawa-
saki-shi, and Makoto Shindo, Urawa-shi, Japan, as-
signors to Showa Denko Kabushiki Kaisha, Tokyo,
Japan
No Drawing. Filed Feb. 14, 1966, Ser. No. 527,083
Claims priority, application Japan, Feb. 20, 1965,
40/9,358; Sept. 24, 1965, 40/58,079
Int. Cl. C08f 7/12; C08d 3/04
U.S. Cl. 260—88.3 A                      12 Claims

ABSTRACT OF THE DISCLOSURE

A process of preparing polyepoxides comprising po-
lymerizing or copolymerizing 1,2-epoxides, using as the
novel catalyst a composition composed of the following
two components:
  (a) A specific metal salt of a carboxylic acid;
  (b) A specific organoaluminum compound to obtain
  a polymer having high crystallinity;
  or three components consisting of (a) and (b) above
  and (c), a specific ether when it is desirable to ob-
  tain low crystallinity.

---

This invention relates to a process of preparing poly-
epoxides. More specifically, this invention relates to a com-
mercially advantageous process of efficiently preparing
from 1,2-epoxides homopolymers or copolymers of high
degree of polymerization with a relatively short reaction
time.

It has been known that the organometallic compounds
of the metals of Group III of the Periodic Table exhibit
polymerization activity with respect to the 1,2-epoxides
(J. Polym. Sci. 27, 584, 1958). The degree of polymeriza-
tion of the polymers obtained by these organometallic
compounds alone is however very low. For the purpose
of raising the degree of polymerization and thus to obtain
commrecially valuable polymers, numerous improvements
have been made in the past relative to the catalyst used.
For instance, there is a method wherein is used a catalyst
consisting of organoaluminum compounds in which has
been incorporated acetylacetonates of titanium, chromium,
vanadium, iron or cobalt. Another method is one in which
used as catalyst the organoaluminum compounds incor-
porated with a hydroxide of a metal of either Group II or
Group III of the Periodic Table. These methods, though
having their strong points, also have weak points, however.
For instance, they have one or more of the following
shortcomings such as that while the reaction proceeds
smoothly, there is required much time in preparing the
catalyst or there is the requirement for special post-treat-
ments employing elevated temperatures; that the reaction
time is extremely long so as to not be commercially prof-
itable; or that the material to be incorporated is one which
is expensive and moreover not recoverable. On the other
hand, U.S. Pat. 2,933,459 discloses a process of polymer-
izing 1,2-epoxides using stannous carboxylates as catalyst.
In this process however, it is only after the reaction has
been carried out over a lengthy period of 40–60 hours at
a temperature of 80–130° C. that the polymerization
makes any substantial progress. Moreover, the yield at
which the polymer is obtained is considerably low and
its molecular weight is not necessarily high. Again, as a
process of obtaining polyepoxides having rubberlike elas-
ticity and of low crystallinity, U.S. Pats. 3,135,705 and
3,135,706 teach a process of using a catalyst prepared
from organoaluminum compounds, water and chelating
agents. However, the molecular weight of the polymer
obtained by this process is relatively low and the polymer
is tacky. Hence, it is somewhat lacking in rubber process-
ability. Further, there is required much time in preparing
and aging the catalyst to be used in this process, and there
is still room for improvement in this respect.

It is the object of the present invention to solve these
difficulties of the hereinabove described prior art processes
and to provide a process whereby it is possible to obtain
readily homopolymer or copolymers of 1,2-epoxides hav-
ing high molecular weight and either high or low crys-
tallinity.

The process of this invention, as hereinafter fully de-
scribed, comprises polymerizing or copolymering 1,2-
epoxides using a new catalyst, namely, a catalyst com-
posed of the two components of (a), a specific metal salt
of a carboxylic acid and (b) a specific organoaluminum
compound; or the three components consisting of the fore-
going two components and (c) a specific ether. Generally
speaking, when it is desired to obtain a polymer having
high crystallinity, the foregoing two-component catalyst
is used. On the other hand, when it is desired to obtain
a polymer having low crystallinity, the foregoing three-
component catalyst is used.

Any 1,2-epoxide may be homopolymerized or copolym-
erized with a second 1,2-epoxide by the process of this
invention to obtain improved results. Typical examples of
1,2-epoxides that may be homopolymerized or copolym-
erized are aklylene oxides, and particularly those contain-
ing 2 to 4 carbon atoms in their molecule, such as ethylene
oxide, propylene oxide, n-butylene oxide and isobutylene
oxide; epihalohydrins such as epichlorohydrin and epibro-
mohydrin; epoxyethers such as methyl glycidyl ether, ethyl
glycidyl ether and allyl glycidyl ether; and other 1,2-
epoxides such as butadiene monoxide, styrene oxide, etc.

The metal salt of carboxylic acid, i.e. component (a),
which is one of the components making up the catalyst
used in this invention, is at least one of the salts of a
metal selected from the group consisting of Zr, Pb, Cr,
Mn, Co, Ni and Fe, and a carboxylic acid selected from
the group consisting of the saturated and unsaturated
monocarboxylic acids containing from 2 to 18 carbon
atoms in their molecule, naphthenic acid and tall oil acid.
Of these metal salts, the Zr-, Cr- or Co-salt is preferably
used, the Zr-salt being especially suitable. Typical exam-
ples of the foregoing aliphatic monocarboxylic acids in-
clude the saturated carboxylic acids such as acetic acid,
propionic acid, butyric acid, caproic acid, octylic acid,
2-ethyl-hexanoic acid, lauric acid, myristic acid, palmitic
acid and stearic acid; the unsaturated carboxylic acids
such as acrylic acid, crotonic acid, octenoic acid, oleic
acid, etc. Of these carboxylic acid salts, most conveniently
used are the salts of either octylic acid or 2-ethyl-hexanoic
acid.

The organoaluminum compound, i.e. component (b),
which is one of the other components making up the cat-
alyst used in this invention, is at least one compound se-
lected from trialkylaluminums and dialkylaluminum
monohalides, wherein the alkyl group contains from 1 to
6 carbon atoms. Typical examples of said trialkylalumi-
nums include trimethylaluminum, triethylaluminum, tri-
isobutylaluminum, trihexylaluminum, etc. And typical ex-
amples of said dialkylaluminum monohalides include di-
methylaluminum chloride, diethylaluminum chloride, di-
ethylaluminum bromide, dibutylaluminum chloride, etc.
Of the trialkylaluminums, especially to be preferred are
triethylaluminum and triisobutylaluminum.

The catalyst to be used in this invention is one which
is composed of the aforementioned two components (a)
and (b) or one which is composed of the foregoing two
components to which is further added the following com-
ponent (c).

The third component (c) is at least on ether selected from the group consisting of three to six-membered cyclic ethers, three to six-membered ethers having a lower aliphatic group as a side chain and chain ethers represented by the formula R—O—R', where R and R' are respectively either aliphatic groups of 1 to 6 carbon atoms, chlorine-substituted aliphatic groups of 1 to 6 carbon atoms, phenyl or lower alkyl-substituted phenyls.

Typical examples of these various ethers include propylene oxide, 1-butene oxide, cyclooxabutane, tetrahydrofuran, dihydrofuran, furan, methyl tetrahydrofuran, tetrahydropyran, dioxane, dimethyl dioxane, choromethyldioxane, diethyl ether, dibutyl ether, methyl propyl ether, alpha-chloromethyl ether, beta-chloroethyl ether, phenylmethyl ether, diphenyl ether, etc. Of these ethers, dioxane and tetrahydrofuran are preferably used.

The several components which are used for making up the catalyst to be used in the present invention, as hereinbefore described, when used individually, do not manifest the desired effects. The intended effects are manifested notably only upon combining the two components (a) and (b) or the components (a), (b) and (c). The catalyst composed of the three components (a), (b) and (c) is particularly effective in yielding with high conversion elastic polymer having high molecular weight and moreover of low crystallinity.

The proportion in which the aforesaid components making up the catalyst used in this invention are used as follows: In the two-component catalyst, the molar ratio of the (b) component, the organoaluminum compound, to the (a) component, the metal salt of carboxylic acid (on the basis of the metal contained therein), ranges between 1.0:001 and 1:2.0, and preferably between 1:0.01 and 1:1.5. On the other hand, in the three-component catalyst, the molar ratio of the (b) component, the organoaluminum compound to the (c) component, the ether, ranges between 1:0.005 and 1:15.0, and preferably between 1:01 and 1:10.0.

The catalyst is made up by mixing the components in the foregoing proportions. And in preparing the foregoing catalyst consisting of the three components (a), (b) and (c), it is particularly necessary that, after mixing these three components, the mixture be aged by maintaining it for a short period of time, say, one minute to a few hours (up to 3 hours) at a temperature ranging between room temperature and 300° C., with the proviso that it is higher than the temperature to be employed in the step of polymerizing the 1,2-epoxide. This temperature is preferably one in the range 100–200° C. and about 20–150° C. higher than the temperature of the polymerization step of the 1,2-epoxide.

The preparation of the catalyst is conveniently carried out in the presence of an inert solvent. The inert solvents which are preferably used include, e.g., aromatic hydrocarbons such as benzene, toluene and xylene and aliphatic hydrocarbons such as pentane, hexane, heptane and octane. It is however also possible to use such halogenated hydrocarbons as methylene chloride and tetrachloroethane singly or as a mixture with the foregoing hydrocarbons. Although the metal salt of carboxylic acid component can be also used in its original solid or liquid form, its handling and metering is facilitated if it is used in a form dissolved in an inert organic solvent, say, toluene, xylene or turpentine oil.

The activity of the catalyst used in this invention is deteriorated by the action of water, oxygen and carbon dioxide. Hence, it is recommended that its preparation be carried out under an atmosphere of an inert gas such as nitrogen, helium and argon. And accordingly, the solvent and polymerization materials used should be those which have been purified by dehydrating and drying and care must also be exercised to ensure that the polymerization reaction is carried out under an inert atmosphere.

The activity of the catalyst according to this invention is great and consequently its use in a relatively small amount will suffice. Fully satisfactory results can be obtained by using it with the 1,2-epoxides, the polymerization starting material, in an amount of 0.5–3.5 mol percent, based on the organoaluminum compound component. This is a smaller amount than that of the conventional processes wherein organoaluminum compounds are used as the calayst component.

The polymerization or copolymerization of 1,2-epoxides according to the invention process can be carried out by either the bulk polymerization, solution polymerization or precipitation polymerization process. However, for removing the polymerization heat generated during the polymerization reaction, preventing the solidification of the resulting polymer and carrying out the polymerization operation smoothly, it is preferred to use a 0.5 to 10-fold volume of solvent, based on the material monomeric 1,2-epoxide. The solvent to be used in the polymerization reaction is suitably chosen from the organic solvents which are inert to the polymerization reaction, such as aromatic hydrocarbons, aliphatic hydrocarbons and halogenated hydrocarbons. While it is permissible to use the same solvent or a different one than that used in preparing the catalyst, it is an advantage from the operational standpoint to use the same one. Although the polymerization reaction can take place within a broad range of temperatures, for example, between —20° and 150° C., it is preferred to operate the polymerization reaction within a temperature range of 0–100° C. When the polymerization is carried out at a proper reaction temperature, the extent of polymerization attains 90–100% in a short period of time. The reaction time is usually of the order of about 2 to about 10 hours, which is a comparatively short period when compared to that of the prior arts. The reaction pressure is usually a range of from normal atmospheric pressure to 50 atmospheres, and preferably a range of from normal atmospheric pressure to 10 atmospheres.

The customary procedures can be employed for removing the catalyst or purifying the resulting polymer. Namely, after completion of the polymerization reaction, the resulting polymer is dissolved, if necessary, using a suitable solvent, e.g., tetrahydrofuran, benzene, toluene, xylene, acetone or carbon tetrachloride, following which it is separated from the catalyst and unreacted monomer by means of the dissolution-precipitation method. As the precipitant, usually used is a solution consisting of methanol or water in which has been mixed a small quantity of hydrochloric acid (0.2–10 vol. percent).

While the properties of the 1,2-epoxide polymer obtained by the invention process are not necessarily uniform, being dependent upon the class of the material monomer, the class of the components of the catalyst and the polymerization reaction conditions, these products are in all cases suitably used as raw materials for the production of various kinds of shaped articles. Especially, in the case the polymerization of 1,2-epoxides is carried out using the aforesaid three-component catalyst, polymers having a crystallinity of less than 30%, and particularly less than 20%, can be obtained readily in a short period of time at high yields. And these polymers are suitably used for various elastic shaped articles and particularly for rubber materials excelling in resistances to heat, oil, weather, ozone and permeation of gas.

The following examples and comparisons will further illustrate this invention. The reduced viscosity $\eta_{sp./c.}$ of the polymers obtained in the examples, unless otherwise noted, is a value obtained by measuring in dioxane of a concentration of 0.3 g./dl. at 30° C. in the case of the homopolymers and copolymers of epichlorohydrin, and a value obtained by measuring in benzene of a concentration of 0.2 g./dl. at 30° C. in the case of the other polymers. On the other hand, the crystallinity of the polymer, unless otherwise indicated, is a value obtained by measuring the crystallinity band of 720 cm.$^{-1}$ by means of the infrared absorption spectrum analysis.

EXAMPLE 1

2.9 grams of a xylene solution of zirconium 2-ethyl hexanoate, said solution containing 12% of Zr as metal, 17.5 grams of benzene and 0.92 gram of triethylaluminum were mixed and heated under argon for 60 minutes at 100° C. to prepare the catalyst. After completion of the preparation, the catalyst solution was returned to room temperature and transferred to a pressure-resistant glass ampoule under a stream of argon, after which 23.6 grams of epichlorohydrin were added and the reaction was carried out for 8 hours at 60° C., with shaking. The reaction product was a light yellow solid. The resulting polymer was shaken with 450 grams of benzene, washed repeatedly with 1 N hydrochloric acid, and washed with alkali and water to eliminate the catalyst, followed by drying under reduced pressure at 50° C. 20.8 grams of polymer were obtained at a yield of 88.1%. The polymer was a tough, white, elastic solid having a reduced viscosity $\eta_{sp./c.}$ of 2.50. When this polymer was separated into acetone-soluble and insoluble portions and a differential thermal analysis was conducted, the former did not exhibit a melting point whereas the latter exhibited a melting point of 98° C. Further, it was found from the infrared absorption spectrum and X-ray diffraction pattern that the latter was a crystalline polymer. The acetone-insoluble portion amounted to 52%.

EXAMPLE 2

2.3 grams of turpentine oil solution of chromium octylate, said solution containing 8% of Cr as metal, 17.5 grams of benzene and 0.92 gram of triethylaluminum were mixed and heated for 60 minutes at 60° C. in an argon atmosphere to prepare the catalyst. After adding 23.6 grams of epichlorohydrin to this catalyst, the reaction was carried out for 10 hours at 60° C. with shaking. The reaction product was purified and dried following the procedures described in Example 1 to obtain 15.8 grams of polyepichlorohydrin. This product was a tough white elastomer having a reduced viscosity of 2.25.

EXAMPLES 3–6

The procedure described in Example 2 was followed, and 2.9 grams of xylene solutions of differing classes of carboxylates of zirconium (said solutions containing 12% of Zr as metal) were mixed respectively with 17.5 grams of benzene and 0.92 gram of triethylaluminum and were then heated for 60 minutes at 60° C. under a stream of argon to prepare the respective catalyst solutions. In polymerizing 23.6 grams each of epichlorohydrin, the following results were obtained depending upon the class of the carboxylate.

| Example | Zirconium carboxylate | Amount obtained, g. | Yield, percent | Reduced viscosity |
|---|---|---|---|---|
| 3 | Zirconium naphthenate | 15.8 | 67.0 | 2.30 |
| 4 | Zirconium oleate | 17.2 | 72.8 | 2.42 |
| 5 | Zirconium salt of tall oil acid | 16.5 | 70.0 | 1.98 |
| 6 | Zirconium linolate | 13.6 | 57.6 | 1.78 |

EXAMPLES 7–8

Catalysts were prepared by varying the class of carboxylic acid of chromium carboxylate and using them in the amounts indicated in the following table, adding respectively 17.5 grams of benzene and 0.92 gram of triethylaluminum and thereafter heating the mixtures for 60 minutes at 60° C. 23.6 grams each of epichlorohydrin were added to these catalyst solutions and reacted for 10 hours at 60° C. with the results shown in the following table depending upon the class of carboxylate used.

| Example | Chromium carboxylate | Amount of chromium carboxylate, g. | Yield, percent | Reduced viscosity |
|---|---|---|---|---|
| 7 | Chromium acetate | 0.94 | 53.2 | 2.18 |
| 8 | Chromium stearate | 0.86 | 50.8 | 2.25 |

EXAMPLE 9

To an ampoule thoroughly purged with argon were added 13.3 grams of n-hexane, 0.85 gram of triethylaluminum and 0.71 gram of a xylene solution of zirconium 2-ethyl hexanoate, said solution containing 12% of Zr as metal. Immediately thereafter 17.2 grams of propylene oxide were added and the polymerization reaction was carried out by allowing the mixture to stand still for 8 hours at 20° C. After completion of the reaction, the catalyst was decomposed by adding benzene and washing with 1 N dilute hydrochloric acid, alkali and water. The so obtained polymer was dried at 50° C. under reduced pressure to yield a white elastomer having a reduced viscosity of 5.8. 11.8 grams (68.6% of theory) of the product were obtained.

EXAMPLE 10

Example 9 was repeated except that 2.85 grams of the xylene solution of zirconium 2-ethyl hexanoate were used to prepare the catalyst and 17.2 grams of propylene oxide were polymerized for 12 hours at 20° C. The yield was 100% and the reduced viscosity of the product was 2.7.

EXAMPLES 11–16

After stoppered Erlenmeyer flasks were thoroughly purged with argon, they were each charged with 13.3 grams of n-hexane, 0.85 gram of triethylaluminum and the metal carboxylates in the amounts indicated in the following table. After allowing to stand for 2 hours at room temperature, 17.2 grams of propylene oxide were added to each flask, which was then stoppered. The reaction was carried out by allowing the reaction mixtures to stand still for 10 hours at 20° C. The reaction products were white to light yellow solids. These were treated and dried as in Example 9 to yield polypropylene oxides, with the following results.

| Ex. | Metal carboxylate | Amount used of metal carboxylate, g. | Yield, percent | Reduce viscosity |
|---|---|---|---|---|
| 11 | Iron naphthenate xylene solution (containing 5% metal as Fe). | 1.12 | 57.1 | 1.70 |
| 12 | Cobalt octylate xylene solution (containing 8% metal as Co). | 0.75 | 59.5 | 2.00 |
| 13 | Lead octylate xylene solution (containing 20% metal as Pb). | 1.03 | 38.5 | 0.76 |
| 14 | Nickel octylate xylene solution (containing 5% metal as Ni). | 1.20 | 48.2 | 1.60 |
| 15 | Cobalt acetate | 0.25 | 60.2 | 1.98 |
| 16 | Manganese naphthenate xylene solution (containing 8% metal as Mn). | 0.68 | 20.8 | 0.51 |

COMPARISON 1

In a pressure-resistant 100-ml. glass ampoule thoroughly purged with nitrogen were placed 20 ml. of propylene oxide and 20 ml. of n-hexane. After adding 0.7 gram of stannous oleate, the reaction was carried out for 48 hours at 30° C., with shaking, but no reaction product was observed. Even when n-hexane was not used as the solvent, the results were the same. Even when stannic oleate was used, polymerization did not take place by means of either solution polymerization or bulk polymerization. Further, when xylene solutions of stannic oleate and zirconium octylate (the solution in both cases containing 12% as metal) were added in amounts such as to equal the amounts indicated above and the reaction was carried out in accordance with the same procedure, polymers were not obtained.

COMPARISON 2

Twenty ml. of propylene oxide and 20 ml. of n-hexane were placed in a pressure-resistant 70-ml. glass ampoule thoroughly purged with argon, after which triethylaluminum was added in an amount of 2.5 mol percent based on the propylene oxide. The reaction was carried out by allowing the reaction mixture to stand still for 60 hours at 20 C. The resulting polymer was greaselike and its reduced viscosity in benzene at 30° C. was 0.04. The yield was 15%.

EXAMPLE 17

A stainless steel 100-ml. microbomb thoroughly purged with argon was charged with 13.3 grams of n-hexane, 1.15 grams of triethylaluminum and 0.95 gram of xylene solution of zirconium octylate, said solution containing 12% of Zr as metal. After adding 17.6 grams of ethylene oxide, the reaction was carried out for 12 hours at 30° C., with shaking. A white solid polymer having a high degree of polymerization was obtained at a yield of 64.5%.

EXAMPLE 18

A stainless steel 100-ml. microbomb thoroughly purged with argon was charged with 13.3 grams of n-hexane, 0.85 gram of triethylaluminum and 0.77 gram of a xylene solution of zirconium octylate, said solution containing 12% of Zr as metal. Then, after adding 6.6 grams of ethylene oxide and 12.9 grams of propylene oxide at the same time, the reaction was carried out for 12 hours at 30° C. The resulting polymer was obtained at a yield of 68.2% and was a solid having a high degree of polymerization.

EXAMPLE 19

A 0.5-liter stainless steel autoclave equipped with a powerful agitator and a forced cooling means was thoroughly purged with argon. This was charged with 175 grams of benzene, 8.9 grams of triethylaluminum and 29.6 grams of a xylene solution of zirconium 2-ethyl hexanoate, said solution containing 12% of Zr as metal, following which the mixture was heated for one hour at 100° C. to prepare the catalyst. After completion of the preparation of the catalyst, the temperature of the mixture was cooled to ca. 10° C., and 212.5 grams of epichlorohydrin and 17.2 grams of propylene oxides were charged to the autoclave. Using an agitation speed of 150 r.p.m., the reaction was carried out for 10 hours at 60° C. After completion of the reaction, the autoclave was cooled to room temperature and the contents were taken out. The product was a light yellow to white solid. A large amount of benzene was added to this reaction product and shaken, following by washing with 1 N dilute hydrochloric acid, alkali and water to remove the catalyst. When the benzene was separated from the product and it was dried at 50° C. under reduced pressure, a tough, white solid whose reduced viscosity was 2.02 was obtained at yield of 95.8%.

EXAMPLE 20

1.14 grams of a xylene solution of zirconium octylate, said solution containing 12% of Zr as metal, 17.5 grams of benzene and 0.86 gram of triethylaluminum were mixed and heated for one hour at 80° C. to prepare the catalyst solution. After adding 18 grams of isobutylene oxide to this catalyst, the reaction was carried out for 20 hours at 50° C. with shaking. After completion of the reaction, the catalyst was eliminated by dissolving the product in benzene and using a solution of dilute hydrochloric acid to obtain 13.5 grams of a white, crystalline substance at a yield of 75.3%. The reduced viscosity $\eta_{sp./c.}$ of this product was 1.78 (c.=0.2 g./dl., chlorobenzene, 100° C.).

EXAMPLE 21

0.68 gram of a xylene solution of zirconium octylate, said solution containing 12% of Zr as metal, 22 grams of benzene and 0.58 gram of triethylaluminum were mixed and heated for one hour at 80° C. to prepare the catalyst. After adding 20.4 grams of styrene oxide to this catalyst, the reaction was carried out for 20 hours at 50° C. to obtain at a yield of 53.6% a waxlike solid having a reduced viscosity of 1.15.

EXAMPLE 22

Using the catalyst solution as prepared in Example 20, 17.5 grams of butadiene monoxide were polymerized for 20 hours at 30° C. After completion of the reaction, the resulting polymer was dissolved in benzene, removed of the catalyst by washing with a dilute hydrochloric acid solution and, after adding 0.12 gram of Santonox as the antioxidant, condensed under reduced pressure at 50° C. and dried. 6.2 grams (35.2% of theory) of a soft waxlike substance having a reduced viscosity of 0.52 were obtained.

EXAMPLE 23

0.54 gram of a xylene solution of zirconium octylate, said solution containing 12% of Zr as metal, 17.5 grams of benzene and 0.55 gram of triethylaluminum were mixed and heated for one hour at 180° C. under an argon atmosphere to prepare the catalyst solution. After adding 19.4 grams of allyl glycidyl ether to this catalyst solution, the reaction was carried out for 12 hours at 30° C. 13.3 grams (68.4% of theory) of a very viscous and tough rubberlike substance were obtained. This product had a reduced viscosity $\eta_{sp./c.}$ of 0.97 (cyclohexane, 50° C., 0.1 g./dl.). As a result of infrared absorption analysis, it was found that the polymerization was effected by means of the oxide bond.

EXAMPLE 24

The catalyst was prepared by mixing 3.52 grams of a xylene solution of zirconium caproate, said solution containing 5% of Zr as metal, 17.5 grams of benzene and 0.86 gram of triethylaluminum, followed by heating for one hour at 80° C. When 17.2 grams of propylene oxide were added to this catalyst and polymerized for 10 hours at 20° C., 16.8 grams (97.5% of theory) of a white elastic solid having reduced viscosity of 3.45 were obtained.

EXAMPLE 25

2.92 grams of a xylene solution of zirconium laurate, said solution containing 8% of Zr as metal, 17.5 grams of benzene and 0.92 gram of triethylaluminum were mixed and heated for one hour at 80° C. to prepare the catalyst solution. After cooling this solution, 23.6 grams of epichlorohydrin were added and the polymerization reaction was carried out for 5 hours at 60° C. 19.5 grams (82.5% of theory) of a white solid having a reduced viscosity of 1.90 was obtained whose crystalline portion was 46%.

EXAMPLE 26

1.70 grams of the xylene solution of zirconium laurate as used in Example 25, 15 grams of a benzene and hexane mixture (volume ratio of 1:1) and 0.85 gram of triethylaluminum were mixed and heated for one hour at 120° C. to prepare the catalyst. When 17.2 grams of propylene oxide were then added to this catalyst and polymerized for 10 hours at 20° C., 16.2 grams (94% of theory) of a white solid having elasticity and a reduced viscosity of 4.20 were obtained.

EXAMPLE 27

Using instead of triethylaluminum in Example 1 2.16 grams of trihexylaluminum and mixing therewith 1.74 grams of a xylene solution of zirconium 2-ethyl hexanoate and 17.5 grams of benzene, the catalyst was prepared by heating this mixture for one hour at 100° C. When 23.6 grams of epichlorohydrin were aded to this catalyst and polymerized for 10 hours at 60° C., 22.2 grams (94.5% of theory) of a white solid having a reduced viscosity of 1.85 and a crystalline portion of 42% were obtained.

EXAMPLE 28

1.14 grams of a xylene solution of zirconium octylate, said solution containing 12% of Zr as metal, 17.5 grams of benzene and 0.92 gram of diethylaluminum chloride were heated for one hour at 100° C. to prepare the catalyst solution. When 23.6 grams of epichlorohydrin were added to this solution and polymerized for 10 hours at 60° C., 8.9 grams (37.5% of theory) of a white solid having slight elasticity and a reduced viscosity of 1.24 were obtained.

EXAMPLE 29

The catalyst solution was prepared by adding to 17.5 grams of benzene, 0.85 gram of triethylaluminum and 0.62 gram of a xylene solution of zirconium octylate, said xylene solution containing 12% of Zr, and then heating the mixture for 2 hours at 160° C. After adding 17.2 grams of propylene oxide to the so prepared catalyst solution, the reaction was carried out for 12 hours at 30° C., 12.3 grams (71.6% of theory) of propylene oxide having a reduced viscosity of 15.7 were obtained.

EXAMPLE 30

1.6 grams of a xylene solution of zirconium 2-ethyl hexanoate, said solution containing 12% of Zr as metal, 17.5 grams of benzene, 0.37 gram of tetrahydrofuran and 0.62 gram of triethylaluminum were introduced in a stream of argon into a pressure-resistant ampoule and then heated for one hour at 160° C. to prepare the catalyst. After the catalyst was prepared, its temperature was reduced to room temperature, after which 23.6 grams of epichlorohydrin were added and the polymerization reaction was carried out for 10 hours at 50° C., with shaking. After completion of the reaction, the resulting polymer was rendered into a benzene solution, which was then precipitated in a hydrochloric acidified methanol with vigorous stirring. The so obtained polyepichlorohydrin, which was a white rubberlike solid, was dried under reduced pressure. The yield of the polymer was 23 grams (97.5% of theory) and its reduced viscosity was 3.70. The crystalline portion was determined to be 12%. On the other hand, the acetone-insoluble portion was 13.3% in preparing a 1% acetone solution of the polymer. Thus, it was in approximate agreement with the crystalline portion percentage as determined by the aforesaid infrared absorption spectrum method.

On the other hand, if the same procedures as hereinabove described were followed but without using the tetrahydrofuran as a component of the catalyst, 20.4 grams (86.5% of theory) of a tough polymer were obtained, the crystalline portion of which was 48% and whose reduced viscosity was 2.95.

COMPARISON 3

This experiment illustrates the instance where the composition of the catalyst was identical to that of Example 30, but in which the three components of the catalyst were not given an aging treatment. 1.6 grams of xylene solution of zirconium 2-ethyl hexanoate, said solution containing 12% of Zr, 17.5 grams of benzene and 0.62 gram of triethylaluminum were mixed and heated for one hour at 160° C. Then after cooling to room temperature, 0.37 gram of tetrahydrofuran was added. 23.6 grams of epichlorohydrin were added to the so obtained catalyst solution and polymerized for 10 hours at 60° C., with shaking. The resulting polymer was a white resinous solid. The yield was 15.2 grams (64% of theory), the crystalline portion was 51%, and the reduced viscosity was 3.25.

EXAMPLES 31–34 AND COMPARISON 4

The procedure described in Example 30 was followed and 23.6 grams of epichlorohydrin were polymerized using an aging temperature of the catalyst of 180° C. The results obtained were as follows:

| Example | Triethylaluminum, g. | Zirconium 2-ethyl hexanoate solution, g. | Tetrahydrofuran, g. | Yield, percent | $\eta_{sp}/c$ | Crystalline portion, percent | Properties of product |
|---|---|---|---|---|---|---|---|
| 31 | 0.62 | 1.2 | 0.37 | 95.5 | 3.80 | 7 | White, elastic solid. |
| 32 | 0.62 | 1.6 | 0.55 | 98.0 | 4.30 | 7 | Do. |
| 33 | 0.62 | 1.6 | 0.74 | 99.0 | 4.80 | 4 | Do. |
| 34 | 0.62 | 1.6 | 0 | 84.2 | 2.75 | 50 | White solid. |
| Comparison 4 | 0.62 | 0 | 0.37 | 12.0 | <0.2 | 0 | Viscous liquid. |

EXAMPLE 35

The catalyst was prepared as in Example 30 by heating the components for one hour at 160° C., excepting that 1.0 gram of triisobutylaluminum was used instead of triethylaluminum. Using the so prepared catalyst, the polymerization of 23.6 grams of epichlorohydrin was carried out for 10 hours at 60° C. The purified polymer, which was a white, rubberlike solid, was obtained at a yield of 99.5%. Its reduced viscosity was 3.20 and crystalline portion was 5%.

COMPARISON 5

When the polymerization reaction was carried out for 10 hours at 60° C. as in Example 35, but the aging of the catalyst was carried out for one hour at 50° C., a polymer having a reduced viscosity of 2.84 and crystalline portion of 48% was obtained at a yield of 32.4%. When the aging temperature is lower than the polymerization temperature, as in this case, the yield and the degree of polymerization of the resutling polymer declines, and moreover a product of low crystallinity cannot be obtained.

EXAMPLES 36–39

The polymerization reactions of 23.6 grams of epichlorohydrin were carried out, using the three-component catalysts consisting of 1.0 gram of triisobutylaluminum, 1.6 grams of zirconium 2-ethyl hexanoate solution and an ether. The conditions were otherwise identical to those of Example 35. The results are tabulated below.

| Example | Ether | G. | Yield, percent | $\eta_{sp}/c$ | Crystalline portion, percent | Properties of product |
|---|---|---|---|---|---|---|
| 36 | Dioxane | 0.43 | 92.3 | 3.30 | 3 | White, elastic solid. |
| 37 | Tetrahydropyran | 0.99 | 95.0 | 3.54 | 2 | Do. |
| 38 | Furan | 0.35 | 91.1 | 2.45 | 6 | Do. |
| 39 | Anisol | 0.52 | 94.0 | 2.34 | 7 | Do. |

EXAMPLE 40

1.6 grams of a xylene solution of zirconium octylate, said solution containing 12% of Zr, 15.5 grams of benzene, 1.5 grams of diethyl ether and 1.0 gram of triisobutylaluminum were mixed and aged for one hour at 120° C. After cooling, 23.6 grams of epichlorohydrin were added and polymerized for 10 hours at 60° C., with shaking. 21.5 grams (91.2% of theory) of a white, rubberlike solid was obtained as the polymer. Its crystalline portion was 28% and reduced viscosity was 2.78.

EXAMPLE 41

When in Example 40 the epichlorohydrin was polymerized using a catalyst solution in which 2.2 grams of beta-chloroethyl ether were used instead of diethyl ether and whose aging treatment was for one hour at 90° C., a polymer having a crystalline portion of 26% and reduced viscosity of 2.56 was obtained at a yield of 89.2%.

EXAMPLE 42

0.96 gram of a zirconium acetate powder containing 32% of Zr as metal, 17.5 grams of benzene, 0.92 gram of tetrahydrofuran and 1.25 gram of triisobutylaluminum were mixed and heated for one hour at 180° C. to prepare the catalyst. When 23.6 grams of epichlorohydrin were added to this catalyst and polymerized for 10 hours at 60° C., 23.5 grams (99.4% of theory) of a somewhat elastic, white solid were obtained. The reduced viscosity of this product was 3.89 and its crystalline portion was 22%.

EXAMPLE 43

When 1.12 grams of dioxane are used instead of tetrahydrofuran in Example 42, a white, elastic solid having a reduced viscosity of 2.85 was obtained at a yield of 96%. Its crystalline portion was 26%.

EXAMPLE 44

0.6 gram of zirconium propionate powder containing 27% of Zr as metal, 17.5 grams of benzene, 0.46 gram of tetrahydrofuran and 1.25 grams of triisobutylaluminum were mixed and heated for one hour at 180° C. to prepare the polymerization catalyst. 23.6 grams of epichlorohydrin were added to this catalyst and polymerized for 10 hours at 60° C. to yield 22.9 grams (97.2% of theory) of a somewhat elastic, white solid having a reduced viscosity of 3.44 and crystalline portion of 25%.

EXAMPLE 45

3.82 grams of a xylene solution of zirconium caproate, said solution containing 5% of Zr as metal, 17.5 grams of benzene, 0.37 gram of tetrahydrofuran and 0.62 gram of triethylaluminum were mixed and heated for one hour at 160° C. to prepare the catalyst solution. 23.6 grams of epichlorohydrin were added to this catalyst solution and polymerized for 10 hours at 60° C. to yield an elastic, white solid. The yield was 22.7 grams (96% of theory) and the reduced viscosity was 3.20 and crystalline portion was 8%.

EXAMPLE 46

1.14 grams of a xylene solution of zirconium octylate, said solution containing 12% of Zr as metal, 17.5 grams of benzene, 0.92 gram of diethylaluminum chloride and 0.52 gram of tetrahydrofuran were mixed and heated for one hour at 150° C. to prepare the catalyst. When 23.6 grams of epichlorohydrin were added to this catalyst and polymerized for 10 hours at 60° C., 9.7 grams (41% of theory) of an elastic, white solid having a reduced viscosity of 2.34 were obtained.

When this experiment was carried out without using the xylene solution of zirconium octylate, only an oily product was obtained at a yield of 28%.

EXAMPLE 47

1.95 grams of a xylene solution of zirconium octylate, said solution containing 12% of Zr as metal, 17.5 grams of benzene, 0.19 gram of propylene oxide and 0.73 gram of triethylaluminum were mixed and heated for one hour at 180° C. to prepare the catalyst solution. When 23.6 grams of epichlorohydrin were added to this catalyst solution and polymerized for 10 hours at 60° C., a white, hard polymer was obtained at a yield of 100%. Its reduced viscosity $\eta_{sp./c.}$ was 5.30 and its crystalline portion was 60%.

EXAMPLE 48

1.95 grams of a xylene solution of zirconium octylate solution, said solution containing 12% of Zir as metal, 0.37 gram of propylene oxide and 1.25 grams of triisobutylaluminum were mixed and heated for one hour at 160° C. to prepare the catalyst solution. When this catalyst solution was used and 23.6 grams of epichlorohydrin were polymerized for 10 hours at 60° C., 19.7 grams (83.5% of theory) of somewhat elastic, white solid was obtained, whose reduced viscosity $\eta_{sp./c.}$ was 3.80 and crystalline portion was about 29%.

On the other hand, when the experiment was carried out without using zirconium octylate, it was only possible to obtain an oil-like product at a yield of 20%.

EXAMPLE 49

1.95 grams of a xylene solution of zirconium octylate, said solution containing 12% of Zr as metal, 17.5 grams of benzene, 0.37 gram of 1-butene oxide and 0.73 gram of triethylaluminum were mixed and heated for one hour at 140° C. to prepare the catalyst solution. When 23.6 grams of epichlorohydrin were added to this solution and polymerized for 10 hours at 60° C., 22.2 grams (93.8% of theory) of a white solid having a reduced viscosity of 3.50 were obtained.

EXAMPLE 50

1.46 grams of a xylene solution of zirconium octylate, said solution containing 12% of Zr as metal, 17.5 grams of benzene, 0.23 gram of 1-butene oxide and 0.73 gram of triethylaluminum were mixed and heated for one hour at 160° C. to prepare the catalyst. When 14.8 grams of propylene oxide were added to this catalyst and polymerized for 10 hours at 40° C., 13.7 grams (92.5% of theory) of a white solid having a reduced viscosity of 3.70 were obtained.

EXAMPLES 51–55

Catalyst solutions were prepared by heating for one hour at 160° C. mixtures consisting of respectively 1.60 grams of a xylene solution of zirconium octylate, said solution containing 12% of Zr as metal, 17.5 grams of benzene, an ether indicated in the following table and 0.62 of triethylaluminum. When 23.6 grams of epichlorohydrin were polymerized for 10 hours at 60° C. using each of these catalyst solutions, polymers having the properties as tabulated below were obtained.

| Example | Ether | Amount of ether, g. | Yield, g. | Percent of theory | Reduced viscosity | Crystalline portion percent |
|---|---|---|---|---|---|---|
| 51 | 2-methyl tetrahydrofuran | 0.44 | 22.7 | 96.3 | 3.98 | 8 |
| 52 | 2,5-dimethyl dioxane | 0.59 | 21.6 | 91.5 | 3.20 | 7 |
| 53 | Cyclooxabutane | 0.30 | 21.0 | 89.2 | 2.80 | 21 |
| 54 | Dibutyl ether | 1.33 | 22.0 | 93.0 | 2.56 | 27 |
| 55 | Methyl propyl ether | 0.75 | 20.8 | 88.5 | 2.52 | 25 |

EXAMPLE 56

The three components consisting of 1.0 gram of triisobutylaluminum, 1.6 grams of a xylene solution of zirconium octylate and 0.87 gram of diphenyl ether were added to 17.5 grams of benzene and heated for one hour at 160° C. to prepare the catalyst solution. 23.6 grams of epichlorohydrin were polymerized for 10 hours at 60° C. in this solution to yield 21.3 grams (90.5% of theory) of polyepichlorohydrin having a reduced viscosity of 2.15 and containing 14% of a crystalline portion.

EXAMPLE 57

1.90 grams of a xylene solution of zirconium octylate, said solution containing 12% of Zr as metal, 0.73 gram of triethylaluminum, 17.5 grams of benzene and 0.96 gram of isobutylvinyl ether were mixed and heated for one hour at 100° C. to prepare the catalyst solution. When 23.6 grams of epichlorohydrin were reacted in this solution for 10 hours at 60° C., 21.8 grams (92.3% of theory) of a white, elastic solid were obtained, the reduced viscosity of which was 2.40 and the crystalline portion of which was 21%.

EXAMPLES 58-61

When Example 35 was repeated and epichlorohydrin was polymerized, excepting that 1.6 grams of xylene solution (containing 12% as metal) used were those containing instead of zirconium 2-ethyl hexanoate the various zirconium carboxylates indicated in the following table, the results tabulated below were obtained.

| Example | Zirconium carboxylate | Yield, percent | Reduced viscosity | Crystalline portion, percent |
|---|---|---|---|---|
| 58 | Zirconium naphthenate | 58 | 2.45 | 25 |
| 59 | Zirconium oleate | 82 | 2.90 | 24 |
| 60 | Zirconium salt of tall oil acid | 68 | 2.30 | 24 |
| 61 | Zirconium linolate | 59 | 2.65 | 26 |

EXAMPLES 62-64

Polymerization reactions of epichlorohydrin were carried out using the various chromium carboxylates indicated in the following table. The catalysts were prepared by adding the chromium carboxylate, 17.5 grams of benzene, 0.46 gram of tetrahydrofuran and 1.30 grams of triisobutylaluminum, to a pressure-resistant ampoule in a stream of an inert gas and then heating the ampoule for one hour at 120° C. 22.6 grams of epichlorohydrin were added to each of the so prepared catalyst solutions and polymerized for 15 hours at 70° C., with shaking. After completion of the reaction, the reaction products were diluted with benzene and washed with a dilute hydrochloric acid aqueous solution, followed by concentration of the polymeric solution under reduced pressure and drying.

EXAMPLES 65-67

Epichlorohydrin was polymerized using the various metal salts of carboxylic acid shown in the following table. The solution of a metal salt of carboxylic acid, 17.5 grams of benzene, 0.46 gram of tetrahydrofuran and 1.30 grams of triisobutylaluminum were added to a pressure-resistant ampoule in a stream of an inert gas and heated for 30 minutes at 120° C. to prepare the catalyst. 23.6 grams of purified epichlorohydrin were added to each of the catalyst solutions, prepared as above, and polymerized for 20 hours at 80° C., with shaking. The polymers obtained by the reactions were treated as in Examples 62-64.

| Example | Metal salt of carboxylic acid | G. | Yield, percent | Reduced viscosity | Crystalline portion, percent |
|---|---|---|---|---|---|
| 65 | 8% manganese octylate xylene solution | 1.75 | 20 | 1.65 | 32 |
| 66 | 12% cobalt octylate xylene solution | 1.25 | 28 | 1.95 | 23 |
| 67 | 8% nickel octylate xylene solution | 1.85 | 42 | 0.96 | 29 |

EXAMPLE 68

0.8 gram of a xylene solution of zirconium octylate, said solution containing 12% of Zr as metal, 17.5 grams of benzene, 0.50 gram of tetrahydrofuran and 0.74 gram of triethylaluminum were mixed and then heated for one hour at 120° C. in an inert gas. After thoroughly cooling the so prepared catalyst solution to about −20° C., 14.8 grams of propylene oxide were added, following which the temperature was gradually raised and the polymerization reaction was carried out by allowing the mixture to stand still for 12 hours at 30° C. After the reaction, when the reaction product was dissolved in about 300 grams of benzene, washed with 2% HCl aqueous solution, 1% sodium bicarbonate solution and water, following which the benzene was distilled off under reduced pressure at a low temperature, 14.6 grams (98.7% of theory) of a white, elastic solid were obtained. The inherent viscosity, as measured in benzene at 30° C., was 7.5. When this polymer was made into 1% acetone solution, the acetone-insoluble portion was 25.2%.

EXAMPLE 69

Example 68 was repeated except that 0.56 gram of dioxane was used instead of tetrahydrofuran. 14.3 grams (96.5% of theory) of a white, elastic solid having an inherent viscosity of 5.80 were obtained. The crystalline portion, as determined by the acetone solution method, was 26%.

EXAMPLE 70

0.63 gram of cobalt octylate containing 12% of Co as metal, 18 grams of hexane, 0.23 gram of tetrahydrofuran and 0.74 gram of triethylaluminum were mixed and then heated for one hour at 120° C. in an inert gas to prepare the catalyst. 14.8 grams of propylene oxide were added to this catalyst, and the polymerization reaction was carried out for 12 hours at 50° C., with shaking. The so obtained polymer was a bluish tinged and slightly elastic solid which was obtained in an amount of 9.5 grams (64.2% of theory). Its inherent viscosity, as measured in benzene at 30° C., was 1.80, and its acetone-insoluble portion was 28.9%.

EXAMPLE 71

A mixed solution of 21.2 grams of epichlorohydrin and 1.5 grams of propylene oxide was added to a benzene solution containing a catalyst prepared exactly as in Example 31, and the polymerization reaction was carried out for 10 hours at 40° C., with shaking. The polymer obtained was dissolved in benzene and then purified by precipitating with vigorous stirring in a dilute hydrochloric acid aqueous solution. The so obtained copolymer

| Example | Organometallic compound | G. | Chromium carboxylate | G. | Tetrahydrofuran, g. | Yield, percent | Reduced viscosity | Crystalline portion, percent |
|---|---|---|---|---|---|---|---|---|
| 62 | Triisobutylaluminum | 1.30 | 12% chromium naphthenate xylene solution | 1.10 | 0.46 | 83 | 2.30 | 32 |
| 63 | do | 1.30 | 12% chromium octylate xylene solution | 1.10 | 0.46 | 75 | 2.56 | 32 |
| 64 | do | 1.30 | Chromium stearate | 1.13 | 0.46 | 56 | 1.20 | 32 | was white and rubberlke and its yield was 20.2 grams (89% of theory). The result of its Cl analysis was 35.6% and its reduced viscosity in dioxane solution at 30° C. (c.=0.3 g./dl.) was 2.65, while its crystalline portion by means of the acetone solution method was 18%.

EXAMPLE 72

A mixed solution of 13.6 grams of propylene oxide and 2.08 grams of allylglycidyl ether was added to a benzene solution of a catalyst prepared as in Example 71, and the polymerization reaction was carried out by allowing the reaction mixture to stand still for 12 hours at 30° C. After completion of the reaction, the resulting polymer was dissolved in benzene and was washed by shaking in dilute hydrochloric acid aqueous solution, sodium bicarbonate aqueous solution and water. Then after adding 0.5 gram of "Santonox," as the antioxidant, it was concentrated under reduced pressure at a low temperature. The resulting polymer was a tough, rubberlike substance, its yield being 12.3 grams (78% of theory) and its reduced viscosity, 6.50.

EXAMPLE 73

A catalyst solution prepared by heating for one hour at 160° C., the components consisting of 16 grams of zirconium octylate solution containing 12% of zirconium as metal, 7.44 grams of triisobutylaluminum, 3.7 grams of tetrahydrofuran and 175 grams of benzene was introduced into an autoclave equipped with a powerful agitator and a cooling or heating jacket, following which 177 grams of epichlorohydrin were introduced thereinto in a stream of an inert gas. On the other hand, ethylene oxide cooled to −20° to −40° C. in a bomb was introduced via a condensed in a gaseous state and dissolved in the catalyst solution in the autoclave. When the polymerization reaction was continued for 12 hours, adjusting the reaction temperature such that 40° C. was maintained, the amount of ethylene oxide absorbed was 32 grams. After completion of the reaction, when the reaction product was dissolved in benzene and was vigorously stirred in dilute hydrochloric acidified methanol to precipitate the separated polymer, which was then dried under reduced pressure at a low temperature, 188 grams (90% of theory) of a white, elastic solid were obtained. Its reduced viscosity was 5.72, while its acetone-insoluble portion was 9%.

EXAMPLE 74

An autoclave equipped with a powerful agitator and a cooling or heating jacket was purged with an inert gas, after which 752 grams of purified epichlorohydrin and 400 ml. of benzene were charged thereto. 300 ml. of a catalyst solution aged for one hour at 180° C., consisting of 31.4 grams of triisobutylaluminum, 50 grams of 12% zirconium octylate xylene solution and 11.5 grams of tetrahydrofuran, were added, and the polymerization reaction was carried out for 10 hours while adjusting the reaction temperature such that 60° C. was maintained. After completion of the reaction, the reaction product was dissolved in benzene and precipitated with a dilute hydrochloric acid-methanol solution, followed by mixing in 7 grams of phenyl-beta-naphthylamine, as the antioxidant, and drying under reduced pressure at 50° C. The resulting polymer was a tough rubberlike substance, which was obtained in an amount of 709 grams (93.4% of theory). The reduced viscosity of this polymer was 4.74 and its crystalline portion was 8%.

When this polyepichlorohydrin was processed at the following compounding conditions, a rubber excelling in resistance to heat, oil and weather is produced. Its roll processability was also outstanding.

Compounding ingredients

| | Part |
|---|---|
| Polyepichlorohydrin | 100 |
| Carbon black | 50 |
| Zinc stearate | 2 |
| "Nocrac" N.B.C. (antioxidant) | 2 |
| Tri-lead tetroxide | 5 |
| "Nocceler" 22 (antioxidant) | 1.5 |

Processing conditions

| | ° C. |
|---|---|
| Roll temperature | 50–60 |
| Vulcanization, 60 min. | 160 |

The results obtained upon running tests for the various properties of this product were as follows:

| | |
|---|---|
| 100% modulus (kg./cm.$^2$) | 60 |
| 200% modulus (kg./cm.$^2$) | 143 |
| Tensile strength (kg./cm.$^2$) | 199 |
| Elongation (percent) | 320 |
| Hardness (JIS) (O"/30") | 78/72 |
| Oil resistance (A.S.T.M. #3 oil, 100° C., 70 hours): | |
|     Swellability (percent) | 9.8 |
| Heat resistance test, after 3 days in an air oven at 150° C.: | |
|     100 modulus (kg./cm.$^2$) | 130 |
|     Tensile strength (kg./cm.$^2$) | 232 |
|     Elongation (percent) | 190 |

We claim:

1. The process of preparing poly(epoxide)s which comprises polymerizing epoxides selected from the group consisting of alkylene oxides containing 2–4 carbon atoms in their molecules, epihalohydrins, aliphatic glycidol ethers, butadiene monooxide, and styrene oxide by contacting at least one 1,2-epoxide with a catalyst obtained by mixing
   (a) a zirconium salt of a carboxylic acid, wherein the carboxylic acid is selected from the group consisting of aliphatic monocarboxylic acids containing from 2–18 carbon atoms, naphthenic acid and tall oil acid, and
   (b) from about 0.5 to 3.5 mol percent with relation to the starting epoxide of at least one organoaluminum compound selected from the group consisting of trialkylaluminums and dialkylaluminum monohalides, wherein the alkyl group contains from 1–6 carbon atoms, in a molar ratio of said zirconium salt of carboxylic acid, on the basis of the zirconium contained in it, to said organoaluminum compound within the range of about 0.001:1 to 2.0:1 at a temperature of from −20 to 150° C. at a ratio of the catalyst component.

2. The process of claim 1 wherein said zirconium salt of carboxylic acid is zirconium 2-ethyl hexanoate.

3. The process of claim 1 wherein said zirconium salt of carboxylic acid is zirconium octylate.

4. The process of claim 1 wherein said oragnoaluminum compound is trialkylaluminum, wherein the alkyl group contains from 1 to 6 carbon atoms.

5. The process of preparing poly(epoxide)s which comprises polymerizing epoxides selected from the group consisting of alkylene oxides containing 2–4 carbon atoms in their molecules, epihalohydrins, aliphatic glycidol ethers, butadiene monooxide, and styrene oxide by contacting at least one 1,2-epoxide with a catalyst obtained by mixing
   (a) a zirconium salt of a carboxylic acid, wherein the carboxylic acid is selected from the group consisting of aliphatic monocarboxylic acids containing 2 to 18 carbon atoms, naphthenic acid and tall oil acid,
   (b) from about 0.5 to 3.5 mol percent with relation to the starting epoxide of at least one organoaluminum compound selected from the group consisting of trialkyaluminums and dialkylaluminum monohalides, wherein the alkyl group contains from 1 to 6 carbon atoms, and (c) at least one ether selected from the group consisting of three to six-membered cyclic ethers, three to six-membered cyclic ethers containing a lower aliphatic group as a side chain and chain ethers represented by the formula R—O—R', wherein R and R' are respectively a member of the class consisting of aliphatic groups of 1 to 6 carbon atoms, chlorine substituted aliphatic groups of 1 to 6 carbon atoms, phenyl and lower alkyl-substituted phenyl groups, in the molar ratio of said zirconium salt of carboxylic acid, on the basis of the zirconium contained in it, to said organoaluminum compound within the range of about 0.001:1 to 2.0:1, and of said ether to said organoaluminum compound within the range of 0.005:1 to 15:1, and thereafter holding said mixture at a temperature higher than that at which said epoxide is polymerized for a period ranging from 1 minute to a few hours.

6. The process of claim 5 wherein said ether is tetrahydrofuran.

7. The process of claim 5 wherein said ether is dioxane.

8. The process of preparing poly(epoxide)s which comprises polymerizing epoxides selected from the group consisting of alkylene oxides containing 2–4 carbon atoms in their molecules, epihalohydrins, aliphatic glycidol ethers, butadiene monoxide, and styrene oxide by contacting at least one 1,2-epoxide with a catalyst obtained by mixing (a) a zirconium salt of a carboxylic acid, wherein the carboxylic acid is selected from the group consisting of aliphatic monocarboxylic acids containing from 2–18 carbon atoms, naphthenic acid and tall oil acid, and (b) from about 0.5 to 3.5 mol percent with relation to the starting epoxide of at least one organoaluminum compound selected from the group consisting of trialkylaluminums and dialkylaluminum monohalides, wherein the alkyl group contains from 1–6 carbon atoms, in a molar ratio of said zirconium salt of carboxylic acid, on the basis of the zirconium contained in it, to said organoaluminum compound within the range of about 0.001:1 to 2.0:1 at a temperature of from −20 to 150° C. at a ratio of the catalyst component, and thereafter holding said mixture at a temperature higher than that at which said epoxide is polymerized for a period ranging from 1 minute to a few hours.

9. The process of claim 8 wherein zirconium salt of carboxylic acid is zirconium 2-ethyl hexanoate.

10. The process of claim 8 wherein said zirconium salt of carboxylic acid is zirconium octylate.

11. The process of claim 8 wherein said organoaluminum compound is a trialkylaluminum, wherein the alkyl group contains from 1 to 6 carbon atoms.

12. A process of producing a polymer of an epoxide compound which comprises polymerizing at least one 1,2-epoxide selected from the group consisting of alkylene oxides containing 2–4 carbon atoms in their molecules, epihalohydrins, allyl glycidyl ether, butadiene monooxide and styrene oxide by contacting said 1,2-epoxide with catalytic amount of a catalyst comprising:

(a) an organoaluminum compound selected from the group consisting of trialkylaluminums and dialkylaluminum monohalides, wherein the alkyl group contains from 1–6 carbon atoms; and (b) a zirconium salt of a carboxylic acid wherein the carboxylic acid is selected from the group consisting of saturated aliphatic monocarboxylic acids containing from 2–18 carbon atoms and naphthenic acid.

References Cited
UNITED STATES PATENTS

| | | | |
|---|---|---|---|
| 2,870,100 | 1/1959 | Stewart et al. | 260—2 EP |
| 2,934,505 | 4/1960 | Gurgiolo | 260—2 EP |

HARRY WONG, Jr., Primary Examiner

U.S. Cl. X.R.

252—431; 260—2 EP, 2A, 30.4 R, 32.8; R, 33.6 EP, 33.8 EP, 41 C